US011104335B2

(12) United States Patent
Maeda

(10) Patent No.: US 11,104,335 B2
(45) Date of Patent: Aug. 31, 2021

(54) VEHICLE MOVEMENT PREDICTING DEVICE AND VEHICLE MOVEMENT PREDICTING METHOD

(71) Applicant: Mitsubishi Electric Corporation, Tokyo (JP)

(72) Inventor: Takashi Maeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 244 days.

(21) Appl. No.: 16/135,225

(22) Filed: Sep. 19, 2018

(65) Prior Publication Data
US 2019/0344786 A1    Nov. 14, 2019

(30) Foreign Application Priority Data
May 9, 2018    (JP) .............................. JP2018-090318

(51) Int. Cl.
*B60W 30/095*    (2012.01)
*G08G 1/01*    (2006.01)
*G08G 1/16*    (2006.01)
*G08G 1/015*    (2006.01)

(52) U.S. Cl.
CPC ......... *B60W 30/0956* (2013.01); *G08G 1/015* (2013.01); *G08G 1/0112* (2013.01); *G08G 1/161* (2013.01); *G08G 1/166* (2013.01)

(58) Field of Classification Search
CPC ............ B60W 30/095; B60W 30/0956; G08G 1/0112; G08G 1/096791; G08G 1/161
See application file for complete search history.

(56) References Cited

U.S. PATENT DOCUMENTS

| 2009/0248284 A1* | 10/2009 | Yoshioka | G08G 1/164 |
| | | | 701/117 |
| 2017/0326981 A1* | 11/2017 | Masui | G08G 1/167 |
| 2017/0327118 A1* | 11/2017 | Masui | B60W 40/072 |

FOREIGN PATENT DOCUMENTS

| JP | 2008015920 A | 1/2008 |
| JP | 2011-221698 A | 11/2011 |

OTHER PUBLICATIONS

Notice of Rejection Reason dated Jun. 18, 2019 from the Japanese Patent Office in application No. 2018-090318.

* cited by examiner

*Primary Examiner* — Anshul Sood
(74) *Attorney, Agent, or Firm* — Sughrue Mion, PLLC; Richard C. Turner

(57) ABSTRACT

A vehicle movement predicting device includes an inter-vehicle communication part that obtains vehicle information from communicable vehicles around an own vehicle, a vehicle position measuring part that measures a position of a preceding vehicle of the own vehicle, a communicable vehicle selecting part that decides a past position closest to the position of the preceding vehicle on the basis of the vehicle information, calculates a closest distance between the past position and the position of the preceding vehicle and a direction difference between the preceding vehicle and the communicable vehicle, and thereby selects one from among the communicable vehicles each of which the closest distance and the direction difference are respectively predetermined values or less, as a front vehicle of the preceding vehicle, and a vehicle movement predicting part that predicts a future movement of the preceding vehicle on the basis of the position of the selected communicable vehicle.

14 Claims, 9 Drawing Sheets

VEHICLE MOVEMENT PREDICTING DEVICE AND VEHICLE MOVEMENT PREDICTING METHOD

BACKGROUND OF THE INVENTION

Field of the Invention

The present invention relates to a vehicle movement predicting device and a vehicle movement predicting method.

For various types of vehicle driving support devices, such as one having an anti-collision function and one having a following-distance control function, it is important to predict a future movement of a preceding vehicle in front of an own vehicle.

A method for predicting a future movement of a preceding vehicle is, for example, disclosed in JP-A-2011-221698. JP-A-2011-221698 describes a future movement predicting device including an inter-vehicle communication unit. The inter-vehicle communication unit obtains information such as speed information, vehicle condition information, and acceleration performance information, from a preceding vehicle mounted with an inter-vehicle communication unit around an own vehicle. This preceding vehicle may also be called a "communicable vehicle". The future movement predicting device estimates a future speed variable range of the preceding vehicle on the basis of current operation information of accelerator, brake operation information, and vehicle condition information such as a shift position, engine RPM, and a vehicle acceleration and deceleration performance. Further, the future movement predicting device predicts a future movement of the preceding vehicle on the basis of a speed history from a predetermined past time to current time and the future speed variable range.

The future movement predicting device according to JP-A-2011-221698 performs prediction by using information obtained by means of inter-vehicle communication, such as current speed, acceleration, and deceleration of the communicable vehicle, and a speed history from a predetermined past time to current time. However, in a case of a preceding vehicle that is not mounted with an inter-vehicle communication function, it is difficult to accurately predict a future movement of the preceding vehicle by using only such pieces of information.

SUMMARY OF THE INVENTION

This application discloses a technique for solving the above problem, and an object of the invention is to provide a vehicle movement predicting device and a vehicle movement predicting method that enable highly accurate prediction of a future movement of a preceding vehicle in front of an own vehicle when the preceding vehicle is not mounted with an inter-vehicle communication unit.

A vehicle movement predicting device disclosed in this application includes an inter-vehicle communication part, a vehicle position measuring part, a communicable vehicle selecting part, and a vehicle movement predicting part. The inter-vehicle communication part obtains vehicle information from communicable vehicles around an own vehicle. The vehicle position measuring part measures a vehicle position of a preceding vehicle of the own vehicle. The communicable vehicle selecting part decides a past vehicle position closest to the vehicle position of the preceding vehicle on the basis of vehicle position history data of the vehicle information, calculates a closest distance between the past vehicle position and the vehicle position of the preceding vehicle, as well as a direction difference between the preceding vehicle and the communicable vehicle, and thereby selects one from among the communicable vehicles each of which the closest distance and the direction difference are respectively predetermined values or less, as a front vehicle of the preceding vehicle. The vehicle movement predicting part predicts a future movement of the preceding vehicle on the basis of the information of the vehicle position of the selected communicable vehicle.

A vehicle movement predicting method disclosed in this application includes obtaining vehicle information from communicable vehicles around an own vehicle and measuring a vehicle position of a preceding vehicle of the own vehicle. The method also includes deciding a past vehicle position closest to the vehicle position of the preceding vehicle on the basis of vehicle position history data of the vehicle information, calculating a closest distance between the past vehicle position and the vehicle position of the preceding vehicle, as well as a direction difference between the preceding vehicle and the communicable vehicle, and thereby selecting one from among the communicable vehicles each of which the closest distance and the direction difference are respectively predetermined values or less, as a front vehicle of the preceding vehicle. The method further includes predicting a future movement of the preceding vehicle on the basis of the information of the vehicle position of the selected communicable vehicle.

The vehicle movement predicting device and the vehicle movement predicting method disclosed in this application use vehicle position history information of communicable vehicles around an own vehicle and also use vehicle position information of a preceding vehicle in front of the own vehicle. Each of the communicable vehicles is mounted with an inter-vehicle communication function and provides the vehicle position history information from a predetermined past time to current time. The vehicle position information is obtained by a surroundings monitoring sensor mounted on the own vehicle. Thus, the vehicle movement predicting device and the vehicle movement predicting method enable highly accurate prediction of movement of the preceding vehicle even though the preceding vehicle is not mounted with an inter-vehicle communication function.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
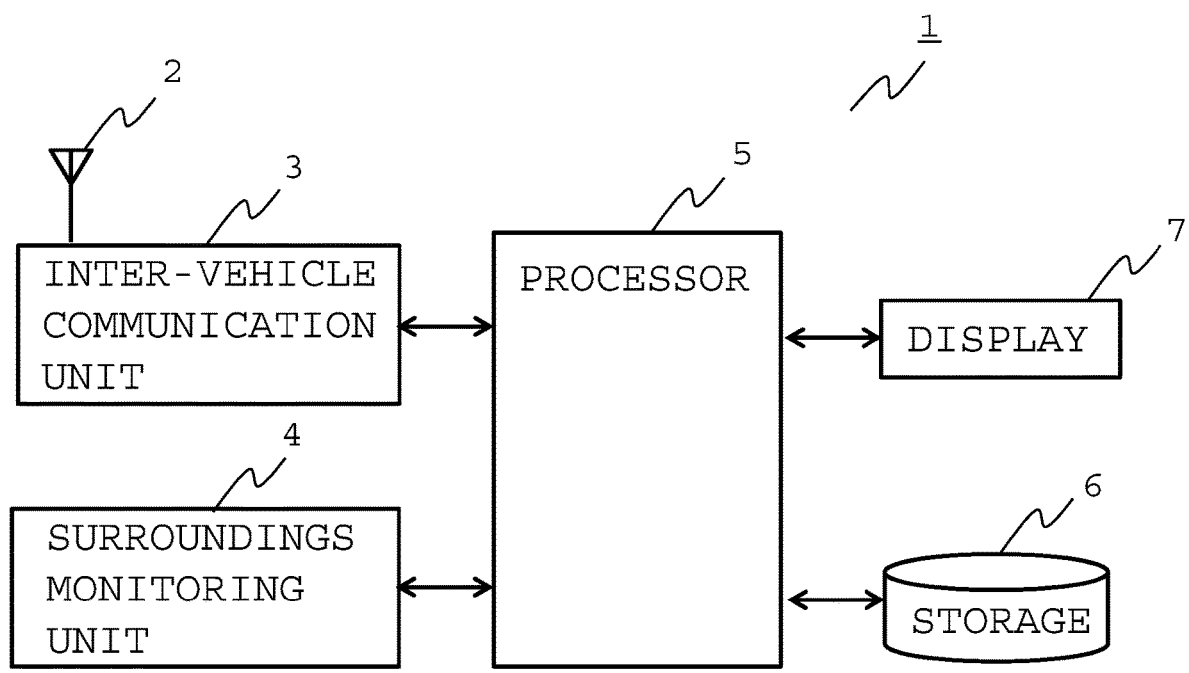
FIG. 1 is a schematic block diagram of a vehicle movement predicting device relating to a first embodiment of this application.
Figure 2:
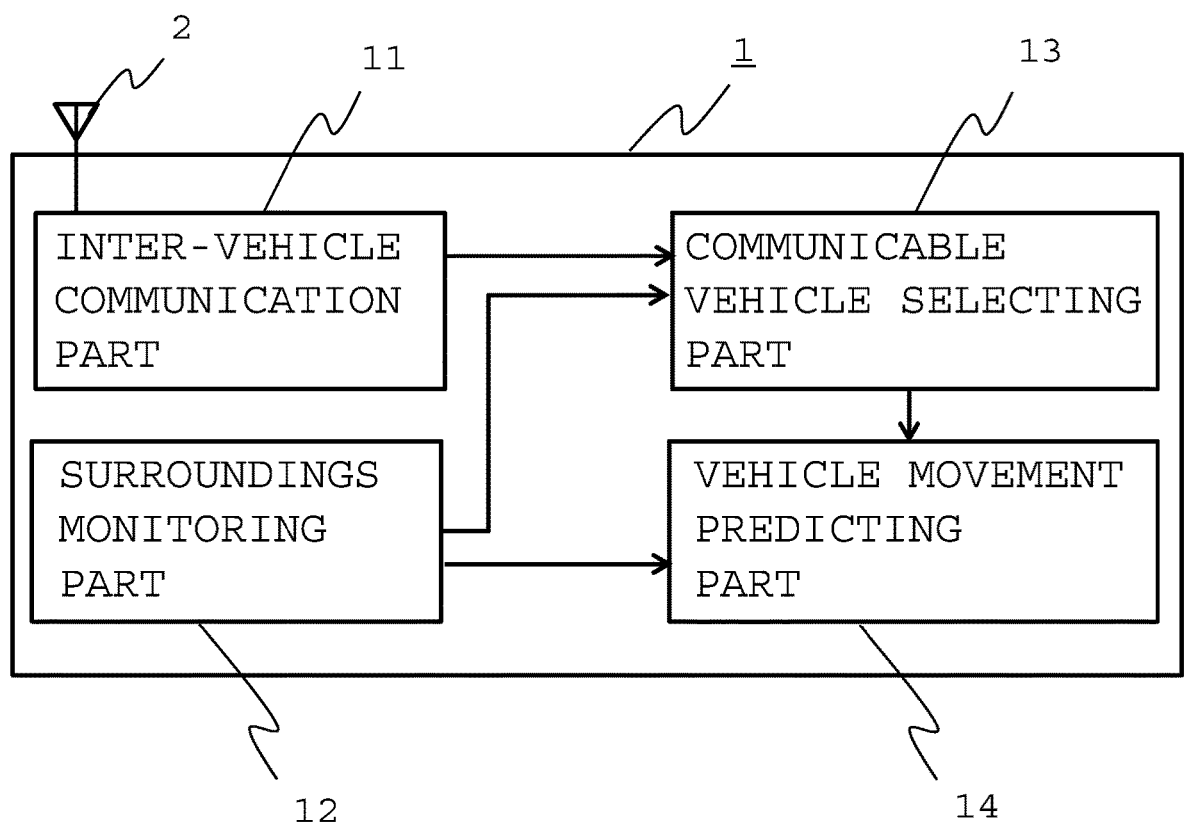
FIG. 2 is a functional block diagram showing a configuration of the vehicle movement predicting device relating to the first embodiment.
Figure 3:
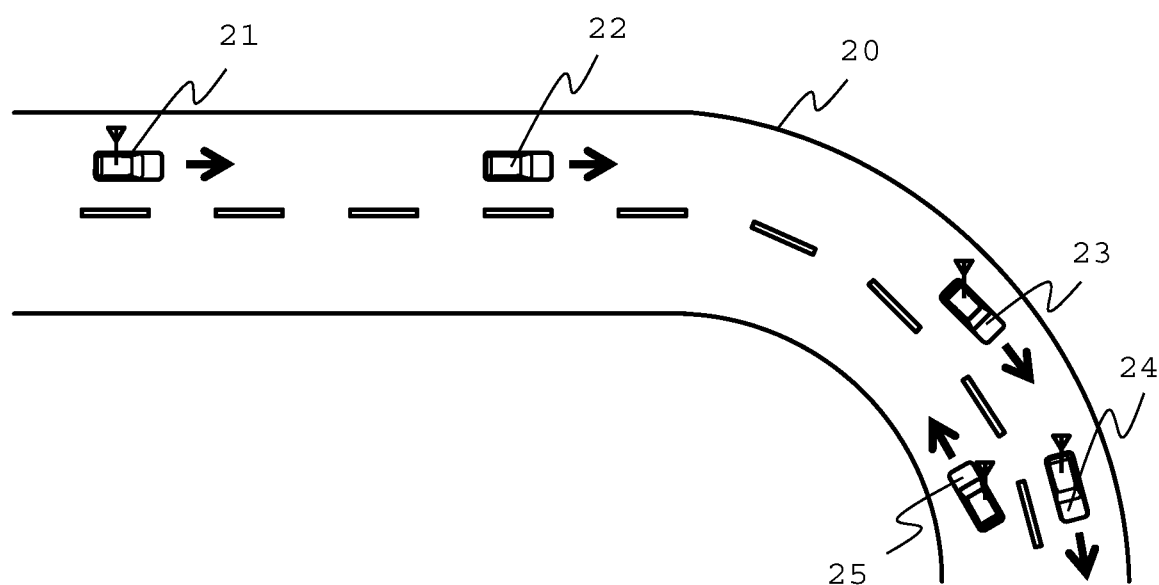
FIG. 3 illustrates an example of vehicle positions for explaining operation of the vehicle movement predicting device relating to the first embodiment.
Figure 4:
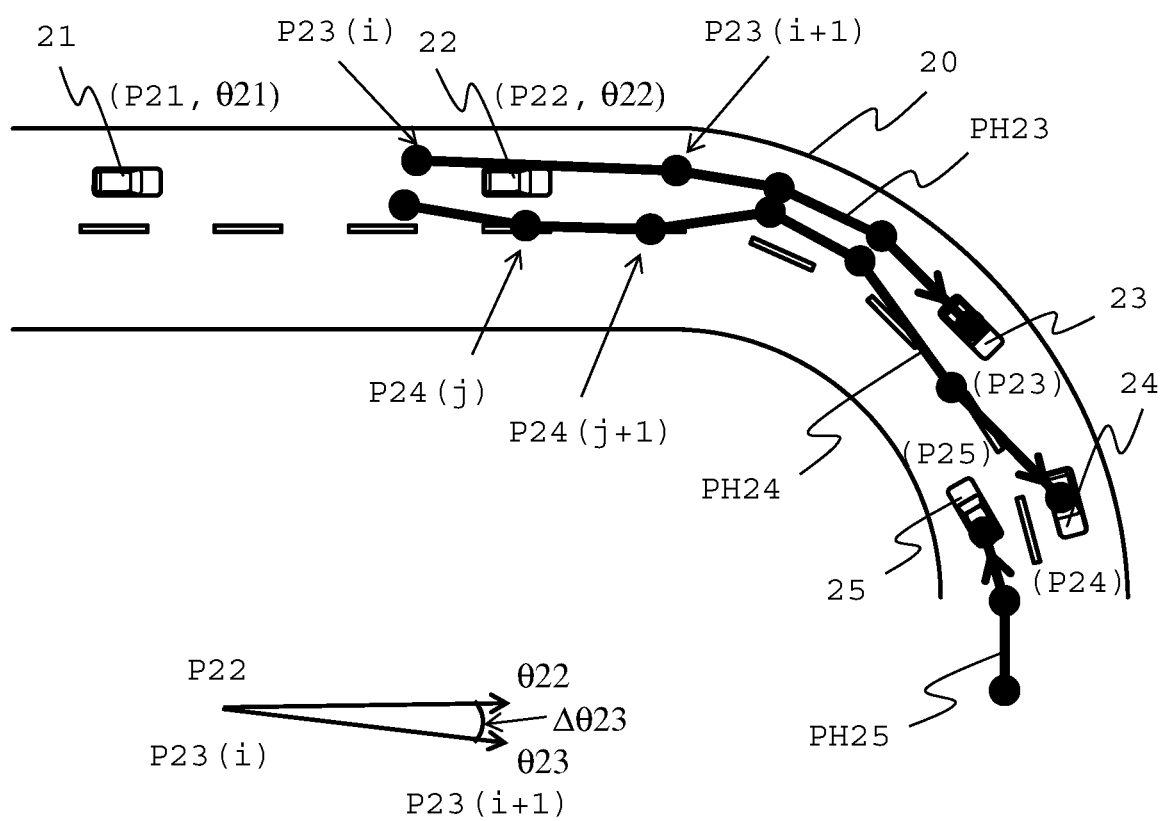
FIG. 4 illustrates the example in FIG. 3 to which past vehicle positions of communicable vehicles are added.
Figure 5:
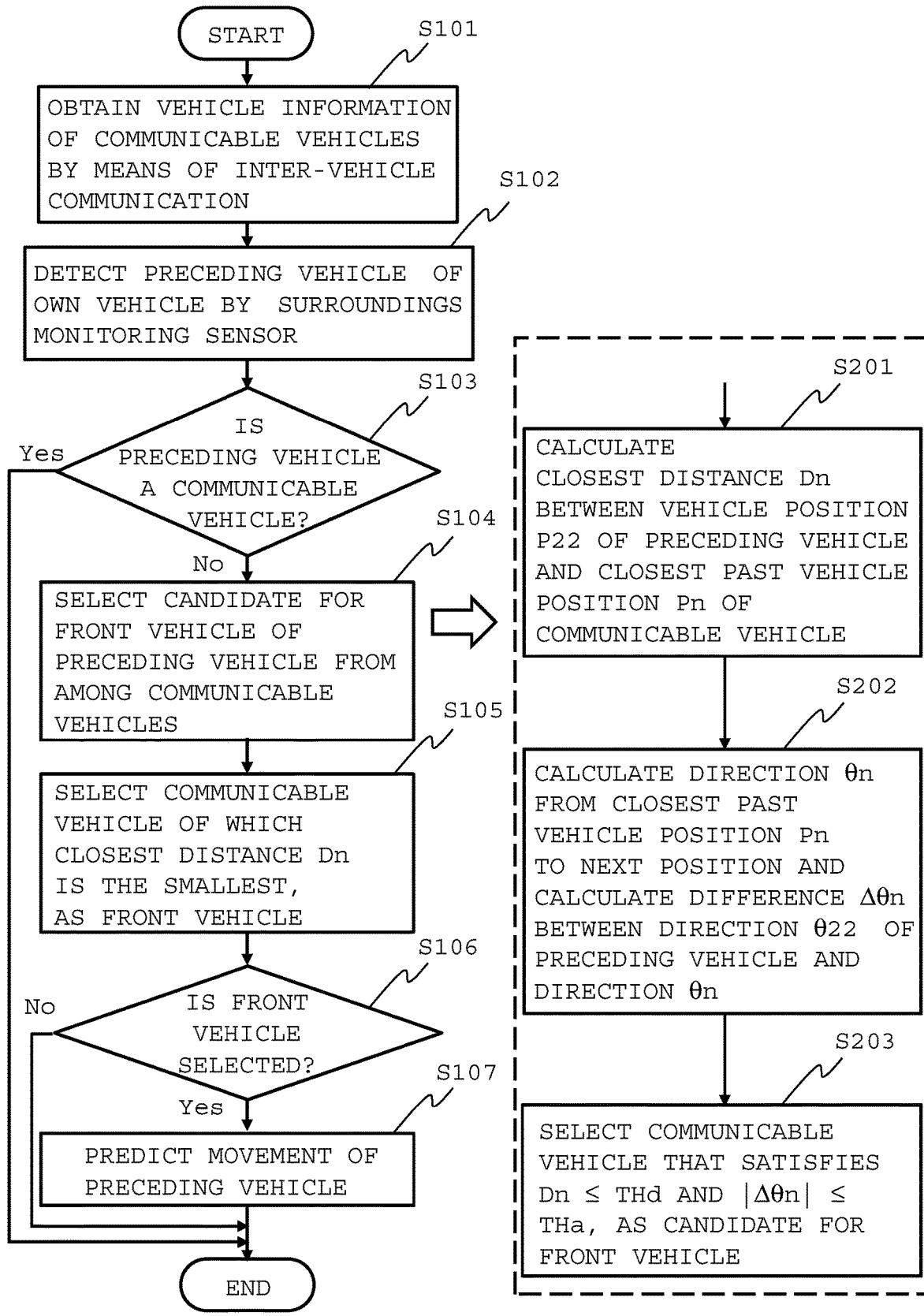
FIG. 5 illustrates a flowchart showing a process procedure for predicting a movement of a preceding vehicle by the vehicle movement predicting device relating to the first embodiment.

FIG. 1 is a schematic block diagram of a vehicle movement predicting device relating to the first embodiment. FIG. 2 is a functional block diagram showing a configuration of the vehicle movement predicting device. FIG. 3 illustrates an example of vehicle positions for explaining operation of the vehicle movement predicting device. FIG. 4 illustrates the example in FIG. 3 to which past vehicle positions of communicable vehicles are added. FIG. 5 illustrates a flowchart showing a process procedure for predicting a movement of a preceding vehicle by the vehicle movement predicting device.

First, the configuration of the vehicle movement predicting device relating to the first embodiment is described with reference to FIG. 1. The vehicle movement predicting device 1 includes an inter-vehicle communication unit 3, a surroundings monitoring unit 4, a processor 5, a storage 6, and a display 7. The inter-vehicle communication unit 3 has a communication antenna 2 via which the inter-vehicle communication unit 3 mutually communicates with other communicable vehicle that is mounted with an inter-vehicle communication unit 3. The surroundings monitoring unit 4 monitors a preceding vehicle 22 of an own vehicle 21. The processor 5 performs an arithmetic process in accordance with a vehicle movement predicting program by using information obtained by the inter-vehicle communication unit 3 and the surroundings monitoring unit 4. The storage 6 stores the vehicle movement predicting program and a result of the arithmetic process performed by the processor 5. The display 7 displays the result of the arithmetic process performed by the processor 5.

FIG. 2 illustrates the configuration of the vehicle movement predicting device 1 in FIG. 1 in terms of functional blocks. The vehicle movement predicting device 1 has functional blocks including an inter-vehicle communication part 11, a surroundings monitoring part 12, a communicable vehicle selecting part 13, and a vehicle movement predicting part 14. The inter-vehicle communication part 11 has the communication antenna 2 and the inter-vehicle communication unit 3 for communicating with other vehicle. The surroundings monitoring part 12 is performed by the surroundings monitoring unit 4, which monitors the preceding vehicle 22 around the own vehicle 21. The communicable vehicle selecting part 13 selects a communicable vehicle 23 as a front vehicle of the preceding vehicle 22 in front of the own vehicle 21, from among communicable vehicles. In this embodiment, the communicable vehicle 23 is selected. The vehicle movement predicting part 14 predicts a future movement of the preceding vehicle 22 in front of the own vehicle 21. Each function of these functional blocks is implemented by the processor 5, the storage 6, and the display 7.

The processor 5 may be composed of dedicated hardware or a central processing unit (CPU, which is also called a "microprocessor", a "microcomputer", a "processor", or a "DSP") that executes the program stored in the storage 6.

In a case of a processor 5 composed of dedicated hardware, the processor 5 is composed of, for example, a single circuit, a composite circuit, a programmed processor, a parallely programmed processor, an ASIC, an FPGA, or a combination thereof. The functions of the communicable vehicle selecting part 13 and the vehicle movement predicting part 14 may be implemented independently of each other by the processor 5 or may be integrally implemented by the processor 5.

In a case of a processor 5 composed of a CPU, the functions of the communicable vehicle selecting part 13 and the vehicle movement predicting part 14 are implemented by software, firmware, or a combination of software and firmware. Software or firmware is described as a program, and programs for these functional blocks are stored in the storage 6. The processor 5 reads and executes the programs stored in the storage 6 to implement the functions of the functional blocks. That is, the vehicle movement predicting device 1 includes the storage 6 that stores programs that, when executed by the processor 5, make a process of selecting a communicable vehicle as a front vehicle of the preceding vehicle 22 and a process of predicting a future movement of the preceding vehicle 22 be executed as a consequence. These programs can also be understood as programs that make a computer execute procedures or methods of the communicable vehicle selecting part 13 and the vehicle movement predicting part 14. The storage 6 is composed of, for example, a RAM, a ROM, a flash memory, a non-volatile or volatile semiconductor memory such as an EPROM or an EEPROM, a magnetic disk, a flexible disk, an optical disc, a compact disc, a mini disc, or a DVD.

One of the functions of the communicable vehicle selecting part 13 and the vehicle movement predicting part 14 may be implemented by dedicated hardware, whereas the other may be implemented by software or firmware. For example, the function of the communicable vehicle selecting part 13 may be implemented by the processor 5 composed of dedicated hardware, whereas the function of the vehicle movement predicting part 14 may be implemented by executing the program stored in the storage 6 by the processor 5.

As described above, the processor 5 implements each of the above functions by using hardware, software, firmware, or a combination thereof.

The inter-vehicle communication unit 3 functions as an inter-vehicle communication part and communicates via the communication antenna 2 with other vehicles around the own vehicle 21, which are capable of making inter-vehicle communication. In this embodiment, the other vehicles are indicated by reference signs 23, 24, and 25 and are hereinafter called "communicable vehicles". That is, the inter-vehicle communication unit 3 exchanges signals with the communicable vehicles 23, 24, and 25, which exist in a predetermined distance from the own vehicle 21. Examples of information to be exchanged by means of the inter-vehicle communication may include a current position in terms of latitude and longitude, measurement accuracy of position, direction, speed, acceleration, operation information of accelerator operated by a driver, brake operation information, acceleration and deceleration performance information such as a shift position, engine speed, brake responsiveness, accelerator responsiveness, engine output torque, and engine performance, history information of vehicle position, and other information relating to the vehicle such as dimensions and vehicle model.

The surroundings monitoring unit 4 functions as a vehicle position measuring part and is a sensor that monitors the preceding vehicle 22 around the own vehicle 21 by using a radar, a front camera, a back camera, or other unit. For example, radar information from the radar or image information from the front camera enables detection of a preceding vehicle and obtaining various kinds of information of the preceding vehicle such as a relative distance, a relative direction, and a relative speed.

The communicable vehicle selecting part 13 functions as a communicable vehicle selecting part of the claims. The communicable vehicle selecting part 13 uses the information that is obtained by the inter-vehicle communication unit 3 through signal exchange with the surrounding communicable vehicles 23, 24, and 25, to select the communicable vehicle 23 as a front vehicle traveling ahead of the preceding vehicle 22 of the own vehicle 21, which is detected by the surroundings monitoring unit 4. The preceding vehicle 22 is detected by the surroundings monitoring unit 4. In the first embodiment, a case of selecting the communicable vehicle 23 is exemplified. The specific process procedure is described later with reference to FIG. 5.

The vehicle movement predicting part 14 functions as a vehicle movement predicting part of the claims. The vehicle movement predicting part 14 predicts a movement of the preceding vehicle 22 of the own vehicle 21 from a movement of the communicable vehicle 23, which is select by the communicable vehicle selecting part 13, and provides data for supporting travel, to a driving support system. The specific process procedure for predicting a vehicle movement is described later with reference to FIG. 5.

Next, operation of the vehicle movement predicting device 1 relating to the first embodiment is described.

FIG. 3 illustrates an example of vehicle positions for explaining operation of the vehicle movement predicting device 1.

In this embodiment, in addition to the own vehicle 21, vehicles 22, 23, 24, and 25 in front of the own vehicle 21 are laid out on a road 20 with one lane in each direction. The own vehicle 21 is mounted with the inter-vehicle communication unit 3. The vehicle 22 is the preceding vehicle 22 of the own vehicle 21 and is not capable of inter-vehicle communication, whereas the vehicles 23, 24, and 25 are capable of inter-vehicle communication. The vehicles 23, 24, and 25 are hereinafter called "communicable vehicles". Among these vehicles, the vehicles 23 and 24 travel in the same direction as the own vehicle 21, whereas the vehicle 25 travels in a direction contrary to the direction of the own vehicle 21. The own vehicle 21 is capable of receiving various kinds of information transmitted from these communicable vehicles 23, 24, and 25. Moreover, the own vehicle 21 is mounted with the surroundings monitoring unit 4 that detects the preceding vehicle 22 traveling ahead of the own vehicle 21.

FIG. 4 illustrates the vehicle layout drawing in FIG. 3 to which vehicle positions Pn of each of vehicle position history data PH23, PH24, and PH25 that are respectively transmitted from the communicable vehicles 23, 24, and 25, are added. The vehicle position history data PH23, PH24, and PH25 contain multiple pieces of data, and more specifically, each vehicle position history data PHn contains past vehicle positions Pn of each of communicable vehicles "n". The past vehicle position Pn is recorded in accordance with a fixed condition, such as each time of traveling for a predetermined time or each time of traveling at a predetermined distance. In this case, the symbol "n" is any one of the numbers 23, 24, and 25. Note that FIG. 4 illustrates the vehicle positions Pn contained in the vehicle position history data PHn in black round marks in time sequence. In addition, FIG. 4 illustrates only data of vehicle positions necessary for explaining this embodiment.

Next, a process procedure for predicting a future movement of the preceding vehicle by the vehicle movement predicting device 1 is described by using a flowchart in FIG. 5.

First, the inter-vehicle communication part 11 receives vehicle information that is transmitted from the communicable vehicles 23, 24, and 25, which are front vehicles around the own vehicle 21 and are capable of inter-vehicle communication (step S101).

Further, the surroundings monitoring unit 4 is made to detect the preceding vehicle 22 that travels immediately in front of the own vehicle 21 and obtain information of a relative vehicle position and a relative direction of the preceding vehicle 22 with respect to the own vehicle 21. The obtained pieces of information of the relative vehicle position and the relative direction of the preceding vehicle 22 are respectively converted into an absolute vehicle position P22 in terms of latitude and longitude and an absolute direction θ22 by using a vehicle position P21 and a direction θ21 of the own vehicle 21 (step S102). At this stage, it is checked that the preceding vehicle 22 is not a communicable vehicle (step S103). If the preceding vehicle 22 is a communicable vehicle, this process is terminated, and instead, an operation for such case is performed (not described in this specification). If the preceding vehicle 22 is not a communicable vehicle, the process advances to the next step S104.

In step S104, a candidate for a front vehicle of the preceding vehicle is selected from among the communicable vehicles. The specific procedure is described in detail by steps from S201 to S203. With respect to the communicable vehicle "n", which is any one of the communicable vehicles 23, 24, and 25 in this embodiment, the communicable vehicle selecting part 13 calculates a distance between each of the vehicle positions Pn and the vehicle position P22 of the preceding vehicle 22 to select a closest past vehicle position Pn(min) that is closest to the preceding vehicle 22 (step S201). The vehicle positions Pn are contained in the vehicle position history data PHn of the history information obtained from the corresponding communicable vehicle "n". The vehicle positions Pn are indicated by the black round marks. At this time, a direction θn from a closest past vehicle position Pn(i) to an immediately next vehicle position Pn(i+1) is calculated by using the vehicle position history data PHn. Further, a direction difference Δθn between the calculated direction θn and the direction θ22 of the preceding vehicle 22, that is, "θn−θ22", is calculated (step S202). If a closest distance Dn, which is a value of (Pn(min)−P22), is a predetermined value THd or less (Dn≤THd), and an absolute value of the direction difference Δθn, |Δθn|, is a predetermined value THa or less (|Δθn|≤THa), the corresponding communicable vehicle "n" is selected as a candidate for the front vehicle of the preceding vehicle 22 (step S203).

The predetermined value THd may be set at, for example, 30 to 50 meters in consideration of a distance to the communicable vehicle to be selected as a candidate for the front vehicle. The predetermined value THa may be set at, for example, 30 to 45 degrees in consideration of the direction of the communication vehicle to be selected as a candidate for the front vehicle in order to distinguish a communicable vehicle in the same direction as the preceding vehicle 22 from a communicable vehicle in a direction contrary to the direction of the preceding vehicle 22.

Specifically, in the example in FIG. 4 showing a vehicle position P23($i$) closest to the preceding vehicle 22, which is contained in the vehicle position history data PH23 of the communicable vehicle 23, a closest distance D23 between the vehicle position P23($i$) and the vehicle position P22 of the preceding vehicle 22 is the predetermined value THd or less. Further, an absolute value |Δθ23| of a direction difference between the direction θ22 of the preceding vehicle 22 and a direction θ23 of the communicable vehicle 23 from the vehicle position P23($i$) to a vehicle position P23($i$+1) is the predetermined value THa or less. Thus, the communicable vehicle 23 is selected as a candidate for the front vehicle of the preceding vehicle 22.

Similarly, a vehicle position P24($j$) is closest to the preceding vehicle 22, which is contained in the vehicle position history data PH24 of the communicable vehicle 24, and a closest distance D24 between the vehicle position P24($j$) and the vehicle position P22 of the preceding vehicle 22 is the predetermined value THd or less. Further, an absolute value |Δθ24| of a direction difference between the direction θ22 of the preceding vehicle 22 and a direction θ24 of the communicable vehicle 24 from the vehicle position P24($j$) to a vehicle position P24($i$+1) is the predetermined value THa or less. Thus, the communicable vehicle 24 is selected as a candidate for the front vehicle of the preceding vehicle 22.

On the other hand, regarding the communicable vehicle 25, which is in the direction contrary to the direction of the preceding vehicle 22, a closest distance D25 between a vehicle position P25 of the communicable vehicle 25 and the vehicle position P22 of the preceding vehicle 22 is greater than the predetermined value THd. Also, an absolute value |Δθ25| of a direction difference between the direction θ22 of the preceding vehicle 22 and a direction θ25 of the communicable vehicle 25 is less than the predetermined value THa. Thus, the communicable vehicle 25 is not selected as a candidate for the front vehicle of the preceding vehicle 22. As a result, the communicable vehicle 25 is excluded from candidates for the front vehicle of the preceding vehicle 22.

Thereafter, among the communicable vehicles selected in step S104 as candidates for the front vehicle of the preceding vehicle 22, which are the communicable vehicles 23 and 24 in this example, the communicable vehicle 23 of which the closest distance Dn from the preceding vehicle 22 is the smallest is selected as the front vehicle of the preceding vehicle 22 (step S105).

Next, it is determined whether the front vehicle of the preceding vehicle 22 is selected from among the communicable vehicles "n" around the own vehicle 21 (step S106). If it is determined that the front vehicle is selected, the process advances to the next step S107. Otherwise, if it is determined that the front vehicle is not selected, the process is terminated.

Then, the vehicle position P23($i$+1) immediately in front of the preceding vehicle 22 is selected from the history data PH23 of the communicable vehicle 23 that is selected as the front vehicle, and the vehicle position P23($i$+1) and subsequent vehicle positions are determined as a predicted movement of the preceding vehicle 22 (step S107).

Figure 6:
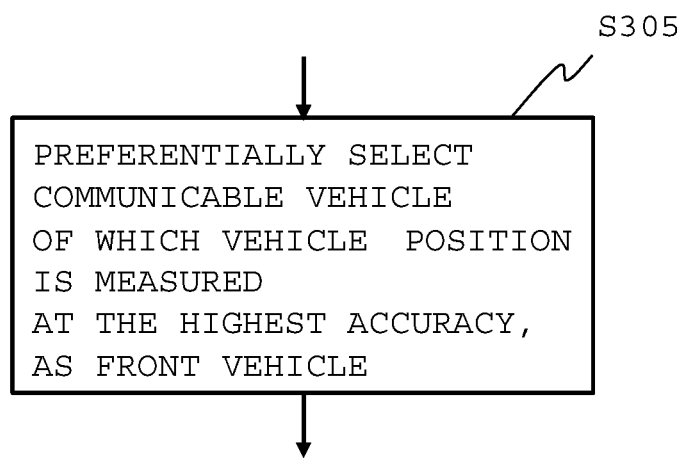
FIG. 6 illustrates another method for selecting a front vehicle by a communicable vehicle selecting part of the first embodiment.

This example is a case of selecting the communicable vehicle 23 as the front vehicle of the preceding vehicle 22 from among the candidates for the front vehicle of the preceding vehicle 22, because the closest distance Dn from the preceding vehicle 22 is the smallest. However, a communicable vehicle of which the vehicle position is measured at the highest accuracy may be preferentially selected from among the candidates for the front vehicle of the preceding vehicle 22, by using information obtained from the communicable vehicles of accuracy in vehicle position measurement (step S305 in FIG. 6).

The above process enables selecting a communicable vehicle of which the past vehicle position is the closest to the position of the preceding vehicle, as the front vehicle of the preceding vehicle, and therefore, future movement of the preceding vehicle is predicted more accurately.

As described above, the vehicle movement predicting device relating to the first embodiment uses the vehicle position history information from a predetermined past time to current time of the communicable vehicles around the own vehicle to determine a front vehicle of the preceding vehicle with no on-board inter-vehicle communication unit from among the communicable vehicles. The vehicle position history information is obtained by means of the inter-vehicle communication. The preceding vehicle is detected by the surroundings monitoring unit. The vehicle movement predicting device uses the vehicle position history data of the determined front vehicle to predict the movement of the preceding vehicle and to support the driving of the own vehicle on the basis of the prediction.

Second Embodiment

Figure 7:
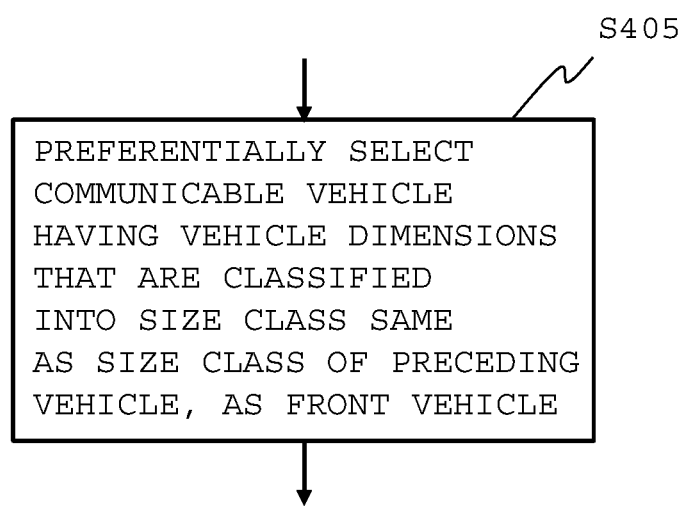
FIG. 7 illustrates a method of a process for selecting a front vehicle by a communicable vehicle selecting part of a vehicle movement predicting device relating to a second embodiment.

FIG. 7 illustrates a method of a process for selecting a front vehicle by a communicable vehicle selecting part of a vehicle movement predicting device relating to the second embodiment.

Step S405 in the process procedure of the communicable vehicle selecting part in the second embodiment differs from step S105 in the process procedure of the communicable vehicle selecting part in the first embodiment in the following way: in step S405, a communicable vehicle that is determined from vehicle dimension information of the communicable vehicle as having vehicle dimensions classified into a size class same as the size class of the preceding vehicle, is preferentially selected as the front vehicle of the preceding vehicle. The process procedure other than in the process performed by the communicable vehicle selecting part is similar to the process procedure for predicting the movement of the preceding vehicle in the first embodiment, and thus, descriptions thereof are not repeated.

The process of selecting a front vehicle by the communicable vehicle selecting part in the second embodiment is described with reference to FIG. 7.

In step S405, the communicable vehicle selecting part compares the vehicle dimensions of the communicable vehicles, which are selected as candidates for the front vehicle of the preceding vehicle in step S104, with the vehicle dimensions of the preceding vehicle by using vehicle dimension information of the preceding vehicle measured by the vehicle position measuring part and vehicle dimension information of the communicable vehicles obtained by the inter-vehicle communication part. Further, the communicable vehicle selecting part preferentially selects the communicable vehicle that is determined as having vehicle dimensions classified into a size class same as or more similar to the size class of the preceding vehicle, as the front vehicle of the preceding vehicle. After the communicable vehicle is selected, the process advances to step S106.

Thus, the communicable vehicle with vehicle dimensions same as or more similar to the vehicle dimensions of the preceding vehicle is selected as the front vehicle of the preceding vehicle, because the communicable vehicle is expected to have traveling characteristics similar to those of the preceding vehicle. This enables more accurate prediction of a future movement of the preceding vehicle.

As described above, the vehicle movement predicting device relating to the second embodiment compares the vehicle dimensions of the communicable vehicles, which are selected as candidates for the front vehicle of the preceding vehicle, with the vehicle dimensions of the preceding vehicle. Then, the vehicle movement predicting device preferentially selects the communicable vehicle having vehicle dimensions same as or more similar to the dimensions of the preceding vehicle as the front vehicle of the preceding vehicle, because the communicable vehicle is expected to have traveling characteristics similar to those of the preceding vehicle. Thus, the vehicle movement predicting device enables more accurate prediction of a future movement of the preceding vehicle and thereby provides a significant effect.

Third Embodiment

Figure 8:
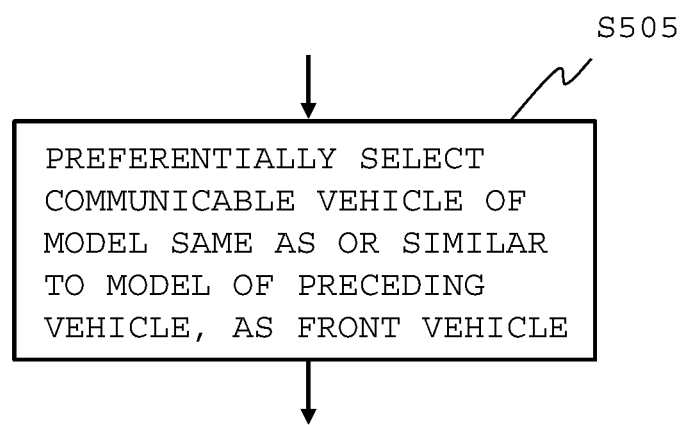
FIG. 8 illustrates a method of a process for selecting a front vehicle by a communicable vehicle selecting part of a vehicle movement predicting device relating to a third embodiment.

FIG. 8 illustrates a method of a process for selecting a front vehicle by a communicable vehicle selecting part of a vehicle movement predicting device relating to the third embodiment.

Step S505 in the process procedure of the communicable vehicle selecting part in the third embodiment differs from step S105 in the process procedure of the communicable vehicle selecting part in the first embodiment in the following way: the communicable vehicle selecting part in the third embodiment determines whether the model of the communicable vehicle is the same as or similar to the model of the preceding vehicle, and if the model of the communicable vehicle is determined as being the same as or similar to the model of the preceding vehicle, the communicable vehicle selecting part preferentially selects the communicable vehicle as the front vehicle of the preceding vehicle. The process procedure other than in the process performed by the communicable vehicle selecting part is similar to the process procedure for predicting the movement of the preceding vehicle in FIG. 5 of the first embodiment, and thus, descriptions thereof are not repeated.

The process performed by the communicable vehicle selecting part in the third embodiment is described with reference to FIG. 8.

The storage 6 is preliminarily made to store a vehicle model classification table in which vehicles are classified by vehicle model.

In step S505, the communicable vehicle selecting part checks the models of the communicable vehicles, which are selected as candidates for the front vehicle of the preceding vehicle in step S104, against the vehicle model classification table by using vehicle model information of the preceding vehicle detected by the vehicle position measuring part and vehicle model information of the communicable vehicles obtained by the inter-vehicle communication part. Further, the communicable vehicle selecting part preferentially selects the communicable vehicle of a model same or similar to the model of the preceding vehicle as the front vehicle of the preceding vehicle, because the communicable vehicle is expected to have traveling characteristics similar to those of the preceding vehicle. After the communicable vehicle is selected, the process advances to step S106.

Thus, the communicable vehicle of the model same as or similar to the model of the preceding vehicle is selected as the front vehicle of the preceding vehicle, because the communicable vehicle is expected to have traveling characteristics similar to those of the preceding vehicle. This enables more accurate prediction of a future movement of the preceding vehicle.

As described above, the vehicle movement predicting device relating to the third embodiment compares the vehicle models of the communicable vehicles, which are selected as candidates for the front vehicle of the preceding vehicle, with the vehicle model of the preceding vehicle. Then, the vehicle movement predicting device preferentially selects the communicable vehicle of a model same as or similar to the model of the preceding vehicle as the front vehicle, because the communicable vehicle is expected to have traveling characteristics similar to those of the preceding vehicle. Thus, the vehicle movement predicting device enables more accurate prediction of a future movement of the preceding vehicle and thereby provides a significant effect.

Forth Embodiment

Figure 9:
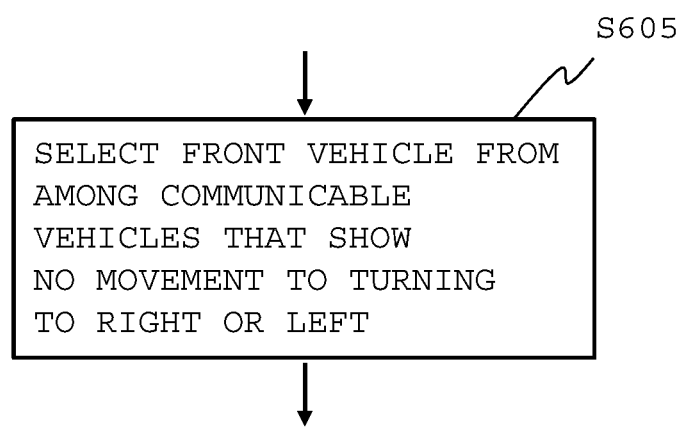
FIG. 9 illustrates a method of a process for selecting a front vehicle by a communicable vehicle selecting part of a vehicle movement predicting device relating to a fourth embodiment.

FIG. 9 illustrates a method of a process for selecting a front vehicle by a communicable vehicle selecting part of a vehicle movement predicting device relating to the fourth embodiment.

Step S605 in the process procedure of the communicable vehicle selecting part in the fourth embodiment differs from step S105 in the process procedure of the communicable vehicle selecting part in the first embodiment in the following way: the communicable vehicle selecting part in the fourth embodiment determines whether information of movement of turning to right or left of each of the communicable vehicles is obtained from the inter-vehicle communication part, and then the communicable vehicle selecting part preferentially selects the communicable vehicle that is determined as not showing movement of turning to right or left, as the front vehicle of the preceding vehicle. The process procedure other than in the process performed by the communicable vehicle selecting part is similar to the process procedure for predicting the movement of the preceding vehicle in the first embodiment, and thus, descriptions thereof are not repeated.

The process of selecting a front vehicle by the communicable vehicle selecting part in the fourth embodiment is described with reference to FIG. 9.

In step S605, the communicable vehicle selecting part preferentially selects the communicable vehicle that is determined as not showing movement of turning to right or left, as the front vehicle of the preceding vehicle. This communicable vehicle is selected from among the communicable vehicles that are selected as candidates for the front vehicle of the preceding vehicle in step S104, by using information of movement of turning to right or left of the communicable vehicles obtained by the inter-vehicle communication part. After the communicable vehicle is selected, the process advances to step S106.

Thus, a communicable vehicle that shows a movement to turning to right or left is excluded, but instead, a communicable vehicle that is expected to go straight without showing a movement to turning to right or left is selected as the front vehicle of the communicable vehicle, in order to avoid misprediction of a movement of the preceding vehicle. This enables more accurate prediction of a future movement of the preceding vehicle.

As described above, the vehicle movement predicting device relating to the fourth embodiment determines whether there is information of movement of turning to right or left of each of the communicable vehicles, which are selected as candidates for the front vehicle of the preceding vehicle. Further, the vehicle movement predicting device preferentially selects the communicable vehicle that is determined as not showing movement of turning to right or left, as the front vehicle of the preceding vehicle. This enables more accurate prediction of a future movement of the preceding vehicle.

The vehicle movement predicting device relating to any of the above embodiments may be implemented as a partial function of a driving support device or may be implemented as an independent device.

Each of the above embodiments describes a process in a case in which the preceding vehicle of the own vehicle is not mounted with a communication function. However, the function for this process, which is not mounted with a communication function of any of the above embodiments may be added to a function for a process that is performed in a case in which the preceding vehicle is mounted with a communication function. In addition, of course, each of the above embodiments can be used in a case in which the communication function of the preceding vehicle does not operate normally.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A vehicle movement predicting device comprising:
    an antenna configured to obtain communicable vehicle information from a plurality of communicable vehicles around an own vehicle, through wireless communication with the plurality of communicable vehicles;
    a vehicle position detector that comprises either one or both of a radar and a camera to measure an incommunicable vehicle position of an incommunicable preceding vehicle of the own vehicle; and
    at least one processor that based on the communicable vehicle information obtained from the plurality of communicable vehicles through the wireless communication, and the incommunicable vehicle position of the incommunicable preceding vehicle that is measured through either one or both of the radar or the camera:
        decides a past communicable vehicle position closest to the incommunicable vehicle position on a basis of comparison between vehicle position history data of the communicable vehicle information and the incommunicable vehicle position, for each of the plurality of communicable vehicles;
        calculates a closest distance between the past communicable vehicle position of each of the plurality of communicable vehicles and the incommunicable vehicle position, as well as a direction difference between a travel direction of the incommunicable preceding vehicle and a travel direction from the past communicable vehicle position at the closest distance, to an immediately next position in the vehicle position history data of the communicable vehicle information, for each of the plurality of communicable vehicles;
        selects, from among the plurality of communicable vehicles, candidate communicable vehicles of which the closest distance and the direction difference of each of the candidate communicable vehicles are less than or equal to predetermined values, respectively; and
        predicts a future movement of the incommunicable preceding vehicle on a basis of the vehicle position of one of the candidate communicable vehicles.

2. The vehicle movement predicting device according to claim 1, wherein the at least one processor selects the one of the candidate communicable vehicles when the closest distance from the incommunicable preceding vehicle to the one of the candidate communicable vehicles is smaller than the closest distance from the incommunicable preceding vehicle to any other candidate communicable vehicle.

3. The vehicle movement predicting device according to claim 1, wherein the at least one processor selects the one of the candidate communicable vehicles of which the vehicle position is measured at the highest accuracy.

4. The vehicle movement predicting device according to claim 1, wherein the at least one processor selects the candidate communicable vehicles having vehicle dimensions that are classified into a size class same as the size class of the incommunicable preceding vehicle.

5. The vehicle movement predicting device according to claim 1, wherein the at least one processor selects the candidate communicable vehicles of a model same or similar to the model of the incommunicable preceding vehicle.

6. The vehicle movement predicting device according to claim 1, wherein the at least one processor selects the candidate communicable vehicles from among the plurality of communicable vehicles that show no movement to turning to right or left.

7. The vehicle movement predicting device according to claim 1, wherein the vehicle position history data used by the at least one processor contains a vehicle position history from a predetermined past time to a current time of each of the plurality of communicable vehicles.

8. A vehicle movement predicting method comprising:
    obtaining communicable vehicle information from a plurality of communicable vehicles around an own vehicle, through wireless communication with the plurality of communicable vehicles;
    measuring an incommunicable vehicle position of an incommunicable preceding vehicle of the own vehicle, by using either one or both of a radar or a camera;
    based on the communicable vehicle information obtained from the plurality of communicable vehicles, and the incommunicable vehicle position of the incommunicable preceding vehicle that is measured through either one or both of the radar or the camera, deciding a past communicable vehicle position closest to the incommunicable vehicle position on a basis of comparison between vehicle position history data of the communicable vehicle information and the incommunicable vehicle position, for each of the plurality of communicable vehicles, calculating a closest distance between the past communicable vehicle position of each of the plurality of communicable vehicles and the incommunicable vehicle position, as well as a direction difference between a travel direction of the incommunicable preceding vehicle and a travel direction from the past communicable vehicle position at the closest distance, to an immediately next position in the vehicle position history data of the communicable vehicle information, for each of the plurality of communicable vehicles, and selecting, from among the plurality of communicable vehicles, candidate communicable vehicles of which the closest distance and the direction difference of each of the candidate communicable vehicles are less than or equal to predetermined values, respectively; and predicting a future movement of the incommunicable preceding vehicle on a basis of the vehicle position of one of the candidate communicable vehicles.

9. The vehicle movement predicting method according to claim 8, wherein the one of the candidate communicable vehicles is selected by selecting the one of the candidate communicable vehicles when the closest distance from the incommunicable preceding vehicle to the one of the candidate communicable vehicles is smaller than the closest distance from the incommunicable preceding vehicle to any other candidate communicable vehicles.

10. The vehicle movement predicting method according to claim 8, wherein the one of the candidate communicable vehicles is selected by selecting the one of the candidate communicable vehicles of which the vehicle position is measured at the highest accuracy.

11. The vehicle movement predicting method according to claim 8, wherein the selection of the candidate communicable vehicles is performed by selecting the candidate communicable vehicles having vehicle dimensions that are classified into a size class same as the size class of the incommunicable preceding vehicle.

12. The vehicle movement predicting method according to claim 8, wherein the selection of the candidate communicable vehicles is performed by selecting the candidate communicable vehicles of a model same or similar to the model of the incommunicable preceding vehicle.

13. The vehicle movement predicting method according to claim 8, wherein the selection of the candidate communicable vehicles is performed by selecting the candidate communicable vehicles from among the plurality of communicable vehicles that show no movement to turning to right or left.

14. The vehicle movement predicting method according to claim 8, wherein the vehicle position history data used in the selection of the candidate communicable vehicles contains a vehicle position history from a predetermined past time to a current time of each of the plurality of communicable vehicles.

* * * * *